(12) United States Patent
Fricke et al.

(10) Patent No.: US 7,667,192 B2
(45) Date of Patent: Feb. 23, 2010

(54) THERMAL NEUTRON POROSITY FROM NEUTRON SLOWING-DOWN LENGTH, FORMATION THERMAL NEUTRON CAPTURE CROSS SECTION, AND BULK DENSITY

(75) Inventors: Scott H. Fricke, Houston, TX (US); Robert A. Adolph, Houston, TX (US); Mike Evans, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 3 days.

(21) Appl. No.: 11/839,608

(22) Filed: Aug. 16, 2007

(65) Prior Publication Data

US 2009/0045328 A1 Feb. 19, 2009

(51) Int. Cl.
*G01V 5/10* (2006.01)

(52) U.S. Cl. .................... 250/269.4; 250/266

(58) Field of Classification Search ............. 250/269.4, 250/269.1, 266, 265, 264, 390.01, 269.5, 250/262

See application file for complete search history.

(56) References Cited

U.S. PATENT DOCUMENTS 3,483,376 A 12/1969 Locke et al.

(Continued)

OTHER PUBLICATIONS

Alger et al., "The dual-spacing neutron log—CNL," *J. Petrol.*, 24:1073-1083, 1972.

(Continued)

*Primary Examiner*—David P Porta
*Assistant Examiner*—Faye Boosalis
(74) *Attorney, Agent, or Firm*—Darla P. Fonseca; Jaime Castano

(57) ABSTRACT

A method for determining at least one formation property calculated from neutron measurements acquired with a downhole tool includes emitting neutrons from a source in the tool into the formation, detecting neutrons with at least one detector in the downhole tool, calculating a first slowing-down length ($L_1$) based on the detected neutrons, and deriving a second slowing-down length ($L_2$) based on the first slowing-down length ($L_1$). Further steps include deriving a correlation function for relating slowing-down lengths from a first tool to slowing-down lengths associated with a different source, wherein the correlation function depends on formation properties such as bulk density; and applying the correlation function to the slowing-down length of the first tool to derive the slowing-down length of the second tool. A method for determining a thermal neutron formation porosity based on a slowing-down length from epithermal neutron measurements from an electronic neutron source includes converting the slowing-down length into a computed neutron slowing-down length from thermal neutron measurements from a chemical neutron source, wherein the converting uses a correlation function that depends on formation bulk density; deriving a thermal neutron countrate ratio based on the computed neutron slowing-down length, wherein the deriving uses a function that depends on the formation bulk density and formation sigma; and computing the thermal neutron formation porosity from the thermal neutron countrate ratio.

29 Claims, 9 Drawing Sheets

U.S. PATENT DOCUMENTS

| | | | | |
|---|---|---|---|---|
| 3,942,004 A | * | 3/1976 | Kehler | 250/266 |
| 4,423,323 A | * | 12/1983 | Ellis et al. | 250/264 |
| 5,684,299 A | * | 11/1997 | DasGupta | 250/269.2 |
| 5,767,510 A | | 6/1998 | Evans | |
| 5,789,752 A | | 8/1998 | Mickael | |
| 5,804,820 A | * | 9/1998 | Evans et al. | 250/269.6 |

OTHER PUBLICATIONS

McKeon and Scott, "SNUPAR—a nuclear parameter code for nuclear geophysics applications," *IEEE Transactions on Nuclear Science*, 36(1):1215-1219, 1989.

McKeon and Scott, "SNUPAR—a nuclear parameter code for nuclear geophysics applications," *Nuclear Geophysics*, 2(4):215-230, 1988.

Neville et al, "Integrated interpretation of a rich data set from a new-generation LWD tool," Paper 97224, *SPE Annual Technical Conference & Exhibition*, Dallas, TX, Oct. 9-12, 2005.

Scott et al., "Response of a multidetector pulsed neutron porosity tool," *SPWLA 35$^{th}$ Annual Logging Symposium*, Jun. 19-22, 1994.

Weller et al., "A new integrated LWD platform brings next-generation formation evaluation services," *SPWLA 46$^{th}$ Annual Logging Symposium*, Jun. 26-29, 2005.

* cited by examiner

THERMAL NEUTRON POROSITY FROM NEUTRON SLOWING-DOWN LENGTH, FORMATION THERMAL NEUTRON CAPTURE CROSS SECTION, AND BULK DENSITY

BACKGROUND OF INVENTION

1. Field of invention

This invention relates to the determination of formation porosity using neutron measurements.

2. Background Art

In hydrocarbon exploration and production, it is important to determine whether an earth formation contains hydrocarbon and how much hydrocarbon is in the formation. Neutron "porosity" tools are traditionally used to determine the amount of hydrocarbon and water present in pore spaces of earth formations.

A neutron tool contains a neutron-emitting source (either a chemical source or a neutron generator) and one or more axially spaced detectors that respond to the flux of impinging neutrons resulting from the interactions of neutrons with nuclei within the borehole and formation in the vicinity of the borehole. The basic concept of a neutron porosity tool is predicated on the fact that (a) hydrogen is the most effective moderator of neutrons and that (b) most hydrogen found in earth formations is contained in liquid in the pore space of the formation, either as water or as liquid hydrocarbon or gas. For neutrons emitted with a fixed energy by the source, the count rates recorded by the neutron detectors decrease as the volumetric concentration of hydrogen (e.g., porosity) increases.

FIG. 1 shows a simplified schematic illustrating a wireline neutron logging operation. As shown in FIG. 1, a neutron tool 11 is disposed in a wellbore 12. The neutron tool 11 includes a neutron source 13 and one or more neutron detectors 14. The neutron source, which may be a chemical source or an electronic neutron generator, emits neutrons into the formation 15 surrounding the wellbore 12. The emitted neutrons traverse the formation 15 and interact with matter in the formation. As a result of such interactions, the neutrons lose some of their energy. Consequently, the neutrons may arrive at the detector 14 with lower energies. By analyzing the response of the detectors to these neutrons, it is possible to deduce the properties of the surrounding formations. Although discussed by way of example in terms of a wireline tool, it should he noted that the disclosed subject matter may be employed in a while drilling environment. For example, FIG. 1$b$ illustrates a detector neutron porosity device embodied as a logging-while-drilling tool. In this example, a source of fast neutrons 1, a near detector 2 and a far detector 3 are positioned within a drill collar. Various other configurations of detector(s) are also contemplated. The LWD tool 4 is suspended by means of a drill string 5 within a borehole 6 penetrating an earth formation 7 via action of the drill bit 8.

Since neutrons interact with hydrogenous materials, borehole fluids will interfere with neutron measurements. To correct for borehole effects, two detectors are typically used; one at a shorter spacing from the neutron source and the other at a longer spacing. With the dual detectors, it becomes possible to compensate for the borehole effects. Typically, count rate ratios between the count rates detected by the near and far detectors are used to provide a more accurate measurement of formation porosity. Examples of dual detector neutron tools are described in U.S. Pat. No. 3,483,376 and U.S. Pat. No. 5,767,510.

Traditional tools with chemical sources are able to measure the porosity of a formation in the form of a thermal neutron porosity reading. The chemical source typically relies on $(\alpha,Be)$ reactions in an $^{241}$AmBe mixture. Beryllium releases a neutron of approximately 4 MeV when struck by an alpha particle, which is produced by the americium. These high-energy neutrons interact with nuclei in the formation and become slowed mainly by elastic scattering to near thermal energies. The slowing-down process is dominated by hydrogen. At thermal energies, the neutrons diffuse through the material until they undergo thermal capture. Capture is dominated by hydrogen and other thermal neutron absorbers.

Some modern neutron tools are equipped with electronic neutron sources (minitrons). In a typical electronic neutron source, deuterium ($^2$D) and tritium ($^3$T) ions are accelerated towards a target containing the same isotopes. When $^2$D and $^3$T collide, they react to produce high-energy neutrons (about 14 MeV). These high-energy neutrons, when emitted into formations, interact with matter in the formations and gradually lose energy. This process is referred to as slowing down. The slowing-down process is dominated by hydrogen, and is characterized by a slowing-down length ($L_s$). By measuring neutrons at epithermal energies, rather than thermal energies, the response provides a better estimate of hydrogen index, unaffected by thermal absorbers. Thermal neutrons typically have an average energy corresponding to a kinetic energy of 0.025 eV at room temperature, while epithermal neutrons typically have energies corresponding to kinetic energies in the range of 0.4-10 eV. However, some epithermal neutrons may have energies as high as 1 keV. One of ordinary skill in the art would appreciate that these energy ranges are general guidelines, rather than clear-cut demarcations FIGS. 2A and 2B show two different examples of neutron tools: a traditional chemical source neutron tool 20 (e.g., CNL® tool from Schlumberger Technology Corp., Houston, Tex.) and an electronic neutron generator tool 21 (e.g., APS® tool from Schlumberger Technology Corp., Houston, Tex.), respectively. In a chemical source neutron tool 20 shown in FIG. 2A, the chemical source 25 includes a radioactive material, such as AmBe. The chemical source neutron tool 20 also includes a near detector 24 and a far detector 22 to provide a countrate ratio, which is used to calculate the porosity of a formation. The near detector 24 and far detector 22 are thermal neutron detectors. In addition, the tool 20 includes shielding materials 23 that prevent the neutrons generated by the chemical sources from directly reaching the detectors, minimizing the interference from the neutron source 25.

As shown in FIG. 2B, an electronic source neutron tool 21 uses an electronic neutron source 40 to produce high-energy (e.g., 14 MeV) neutrons. The high-energy neutrons emitted into formations are slowed to epithermal and thermal energies by interactions with matter in the formations. The epithermal neutrons are detected by detectors on the neutron tool 21, such as near detector 26, array detector 27, and far detector 29. As with the chemical source tool, the tool 21 includes shielding materials 42 that prevent the neutrons generated by the source from directly reaching the detectors. As noted above, by measuring epithermal neutrons, the detector responses are primarily dominated by the hydrogen content in the formation, without complication from neutron absorbers. Thus, the electronic neutron tool 21 conveniently provides measurements for hydrogen index. In addition, the neutron tool 21 may also include an array thermal detector 28 to detect thermal neutrons that returned from the formation. The epithermal neutron and thermal neutron measurements obtained with this tool can be used to derive various formation parameters.

In clean reservoir formations, the hydrogen index measured by epithermal neutron tools compares very well with traditional neutron porosity measured by thermal neutron tools. However, in shales, the epithermal hydrogen index often differs significantly from thermal neutron porosity. Even though the hydrogen index measurements, which are less susceptible to interference from neutron absorbers, can provide more accurate pore space estimates, they are not as commonly used as the thermal neutron porosity measurements obtained with chemical source tools. Because tools using chemical sources have been used in the industry much longer than electronic source neutron tools, users are more familiar with the thermal neutron porosity measurement. In addition, petrophysicists typically use thermal neutron porosity to indicate specific minerals as part of their formation analysis. However, chemical sources are less desirable due to their constant emission of radiation and strict government regulations. In addition, these chemical sources are becoming scarce. Therefore, there is a need for a method of converting measurements obtained with an electronic source neutron tool into measurements that could have been obtained with a traditional chemical source neutron tool.

SUMMARY OF INVENTION

One aspect of the invention relates to methods for converting the slowing-down length ($L_1$) measured by a first neutron tool in the formation into a slowing-down length ($L_2$) that would be measured by a second neutron tool if it had been in the same formation. A method in accordance with one embodiment of the invention includes deriving a correlation function for relating slowing-down lengths from the first neutron tool to slowing-down lengths from the second neutron tool, wherein the correlation function depends on a bulk density of the formation; and applying the correlation function to the slowing-down length ($L_1$) of the first neutron tool to derive a slowing-down length ($L_2$) of the second neutron tool.

Another aspect of the invention relates to methods for determining a thermal neutron porosity based on a slowing-down length of a formation calculated from neutron measurements acquired with a neutron tool, such as one having an electronic neutron source and epithermal neutron detectors. A method in accordance with one embodiment of the invention includes converting the slowing-down length into a computed slowing-down length corresponding to thermal neutron slowing-down in the formation, wherein the converting uses a correlation function that depends on a bulk density ($\rho$) of the formation; deriving a thermal neutron countrate ratio based on the computed slowing-down length, wherein the deriving uses a function that depends on the formation thermal neutron capture cross section (sigma or $\Sigma$) and the bulk density ($\rho$) of the formation; and computing the thermal neutron porosity from the thermal neutron countrate ratio.

Other aspects and advantages of the invention will be apparent from the following description and the appended claims.

DETAILED DESCRIPTION

Figure 1:
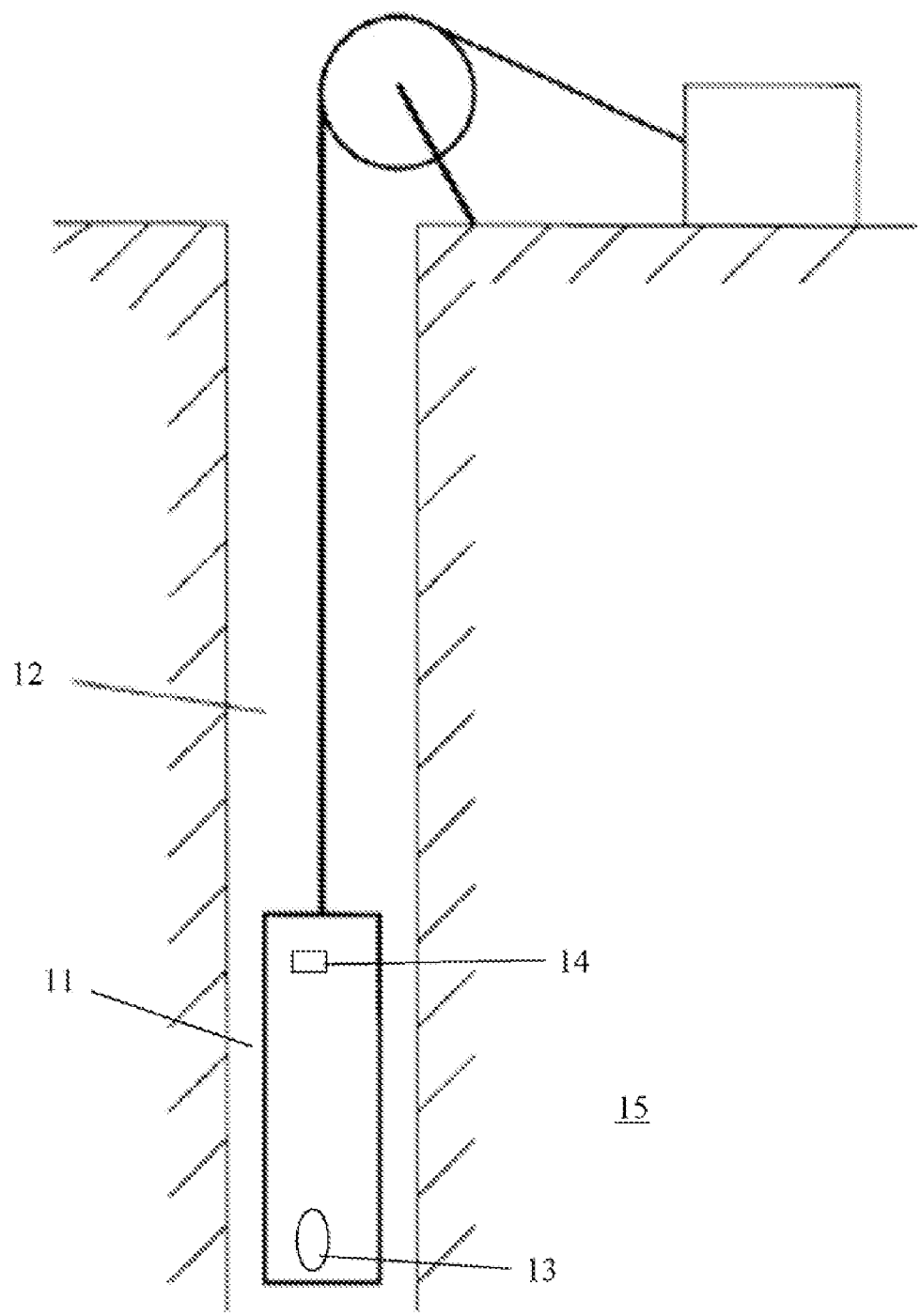
FIG. 1 and 1b show typical wireline and logging-while-drilling neutron logging tools disposed in a well bore.
Figure 1B:
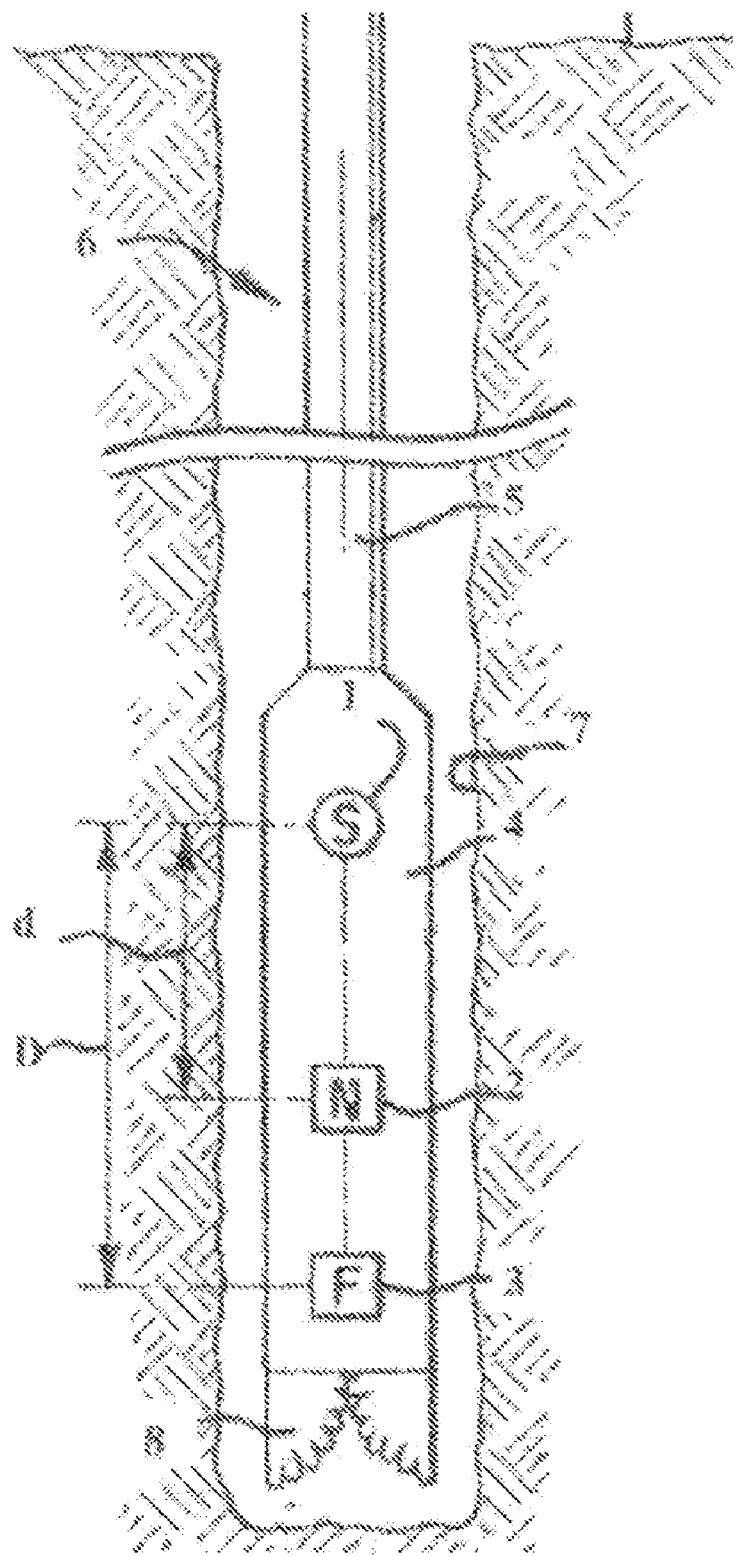

Embodiments of the invention relate to methods for converting measurements made with a first tool into corresponding desired measurements that would have been made if a second tool were used. The first tool and the second tool may have different neutron sources and/or different neutron detectors. Different neutron sources, for example, may include AmBe, californium (Cf), dueterium-deuterium (DD) neutron generator, and deuterium-tritium (DT) neutron generator. Different neutron detectors, for example, may include thermal neutron detectors, epithermal neutron detectors, and fast neutron detectors.

For example, methods of the invention may be used to derive traditional thermal neutron porosities from epithermal neutron measurements made with electronic source neutron tools. As noted above, some modern neutron tools use electronic neutron sources that emit neutrons at higher energies. Some of these tools are designed to measure epithermal neutrons that return from the formation. These epithermal neutron measurements are useful in deriving the slowing-down lengths and hydrogen index. However, the hydrogen index derived from epithermal neutron measurements does not always correspond to thermal neutron porosity obtained from traditional thermal neutron tools. Methods of the invention can reliably derive thermal neutron porosities from epithermal neutron measurements.

The conversion methods in accordance with embodiments of the invention can be applied to measurements obtained with various neutron tools, whether they use chemical sources or electronic sources, or whether they use thermal or epithermal neutron detectors. In addition, the conversion methods of the invention are independent of methods of tool conveyance, such as wireline, slick-line, drill-pipe conveyed, tubing conveyed, while-drilling, or while-tripping tools.

As noted above, different neutron sources may emit neutrons with different initial energies, which will result in different slowing down lengths in the same formation. Furthermore, even with tools having the same sources but different detectors, the measurements obtained with such tools may not have direct correspondence. The electronic source neutron tools (e.g., APS® tool) typically emit neutrons with much higher energies and use epithermal detectors, while traditional chemical source neutron tools (e.g., CNL® tool) emit relatively lower energy neutrons and use thermal neutron detectors. As a result, measurements obtained with these two different types of tools are unlikely to have direct correspondence.

The slowing down process is dominated by interactions with hydrogen in the formation and, therefore, the responses of epithermal neutron detectors have a good correlation with the hydrogen index in the formation. Because thermal neutrons are not detected by the epithermal detectors, the response is generally unaffected by thermal neutron absorbers. Thus, hydrogen index provides a more accurate measurement of pore space in a formation. On the other hand, the responses of thermal neutron detectors are correlated with the hydrogen content in the formation, but are also affected by thermal neutron absorbers, such as chlorine (in salt), and iron (in tools or clays).

Even though hydrogen index measurements can provide more accurate pore space measurements, electronic source neutron porosity tools are not as widely used as anticipated because chemical source neutron tools have been in use longer and users are more familiar with such tools. The chemical source neutron tools typically provide countrate ratios that are then used to derive thermal neutron porosities. Methodologies for converting the countrate ratios from such tools into thermal neutron porosities (i.e., ratio-to-porosity transforms) are well established, see for example Ellis, "Well Logging for Earth Scientists," p. 251, FIGS. 12-6, Elsevier (November 1987). Because users are familiar with thermal neutron porosity, there is a need for methods that can reliably relate the measurements obtained with electronic source neutron tools to either the countrate ratios or the thermal neutron porosities that are traditionally obtained with chemical source neutron tools.

Embodiments of the invention provide methods for converting measurements from one neutron tool to "measurements" that could have been obtained if another neutron tool were used. In accordance with one example of the invention, epithermal neutron measurements may be converted into thermal neutron porosity in the following manner. First, a neutron slowing-down length ($L_1$) of a first tool may be converted into the corresponding neutron slowing-down length ($L_2$) of a second tool, as if the second tool were used to obtain the measurements in the same formation. The conversion process takes into account the formation density ($\rho$). Then, the computed slowing-down length ($L_2$) of the second tool and the thermal neutron capture cross section ($\Sigma$), optionally measured by the first tool, are used to derive a computed countrate ratio, which corresponds to the countrate ratio that would have been obtained if the second tool were used in the measurements. From the computed countrate ratio, the formation porosity may be reliably derived.

Figure 3:
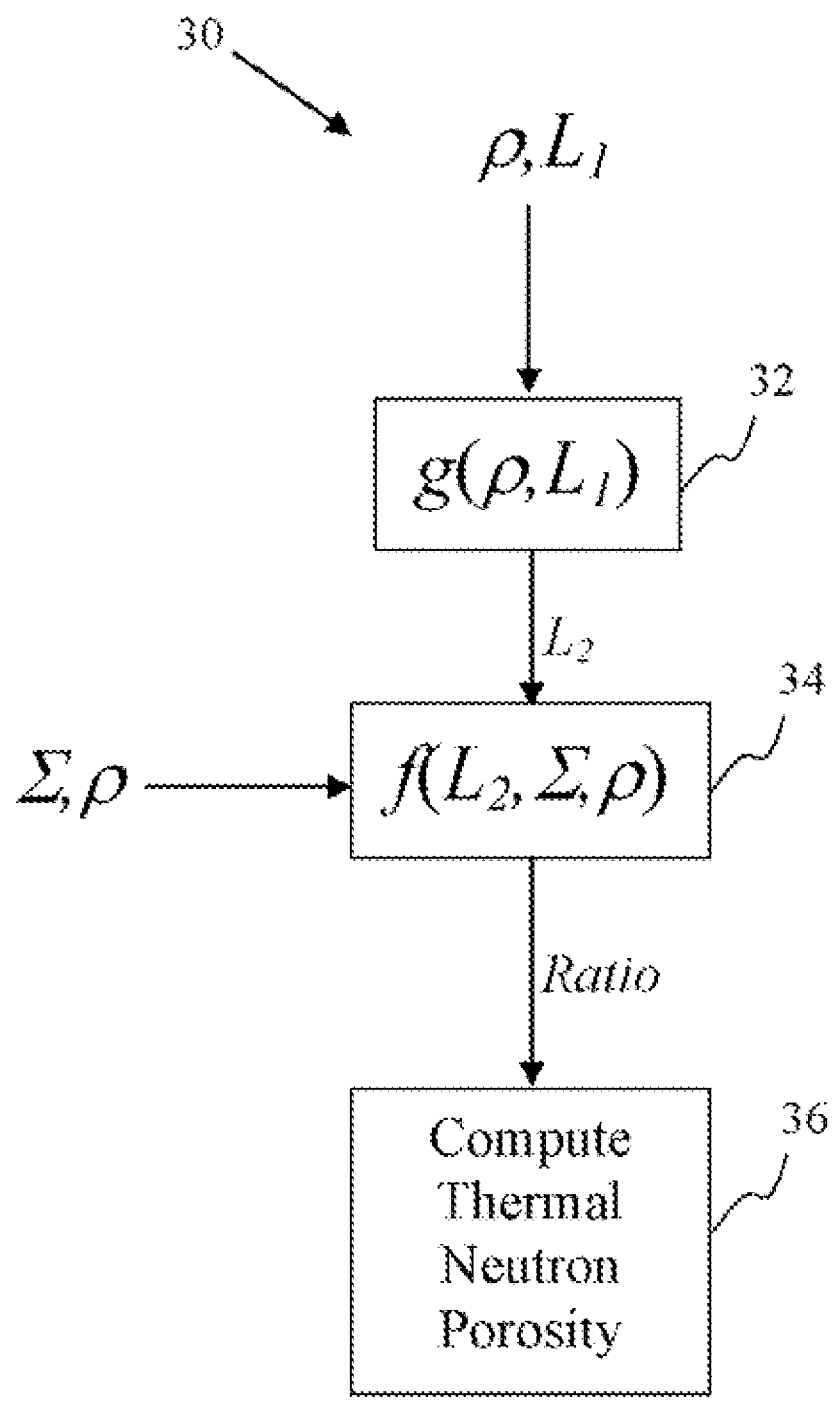
FIG. 3 shows a flow chart illustrating a method in accordance with one embodiment of the invention.

FIG. 3 shows a flow chart illustrating an exemplary method for deriving a countrate ratio that would have been obtained with a second tool based on the slowing down length of a first tool. As shown in FIG. 3, a method 30 first derive a function, g($\rho,L_1$), that may be used to compute a slowing down length ($L_2$) of a second tool based on the slowing down length ($L_1$) of a first tool (shown as 32). While FIG. 3 shows a function that depends on formation density, one skilled in the art would appreciate that other functions that depend on other formation properties (e.g., sigma, slowing-down time, etc.) may also be used. Slowing-down time as a formation property, for example, may be defined as a characteristic time for the decay of the epithermal neutron population, which is dependent on the porosity of the formation.

The slowing-down length of neutrons is a function of both the initial neutron energy and formation properties. Modeling studies have shown that the slowing down lengths for neutrons emitted into the same formation, but with different initial energies, can be correlated by functions that depend on formation bulk density ($\rho$). Thus, the relationship between a slowing down length ($L_1$) of the first, tool and the slowing down length ($L_2$) of the second tool may be expressed as:

$$L_2 = g(\rho, L_1)$$

where g($\rho,L_1$) is the correlation function. This relationship is independent of the types of sources, including AmBe, Cf, and pulsed (or electronic) neutron generators including DD and DT types. Furthermore, the relationship is not limited to specific detector types Other formation properties may be added to improve accuracy of the correlation function.

Once the slowing down length ($L_2$) for the second tool is computed, it may be used to derive the expected countrate ratio of the second tool. This derivation may use a function, $f(L_2, \Sigma, \rho)$, that depends on both the formation sigma ($\Sigma$) and the formation bulk density ($\rho$)(shown as 34). Sigma ($\Sigma$) and bulk density ($\rho$) are properties of the formation and are independent of the neutron sources, while the slowing down length depends on both the initial neutron energy and the formation materials.

Computations show that the dependence on bulk density ($\rho$) may be a second order effect. Therefore, the function, $f(L_2, \Sigma, \rho)$, may be separated into two terms: m($\rho$) and h($L_2, \Sigma$). Thus, the relationship between a countrate ratio and various formation parameters may be expressed as follows:

$$\text{Ratio} = f(L_2, \Sigma, \rho) = m(\rho) \times h(L_2, \Sigma)$$

Note that other functional forms may also be used.

Finally, the computed countrate ratio may then be used to derive thermal neutron porosity using methods known in the art (shown as 36). This derivation may use any transform known in the art for thermal neutron tool analysis.

In the above illustrated method, if the input values ($L_1$, $\rho$, $\Sigma$) have not been corrected for borehole environment effects, then the resulting thermal neutron porosity will require subsequent correction. On the other hand, if these values have been corrected for borehole effects, the derived values should be free of borehole effects. Borehole environment effects include borehole size and geometry, borehole fluids, tool position including standoff, casing and cement, and other materials and conditions that may be present.

As a specific example, the method is used to reproduce the CNF® thermal porosity from the APS® epithermal measurements. This conversion is important and allows an epithermal neutron tool to provide thermal neutron porosity. This would reduce the need for chemical sources, such as AmBe, an advantage for safety, security, and environment.

Figure 2:
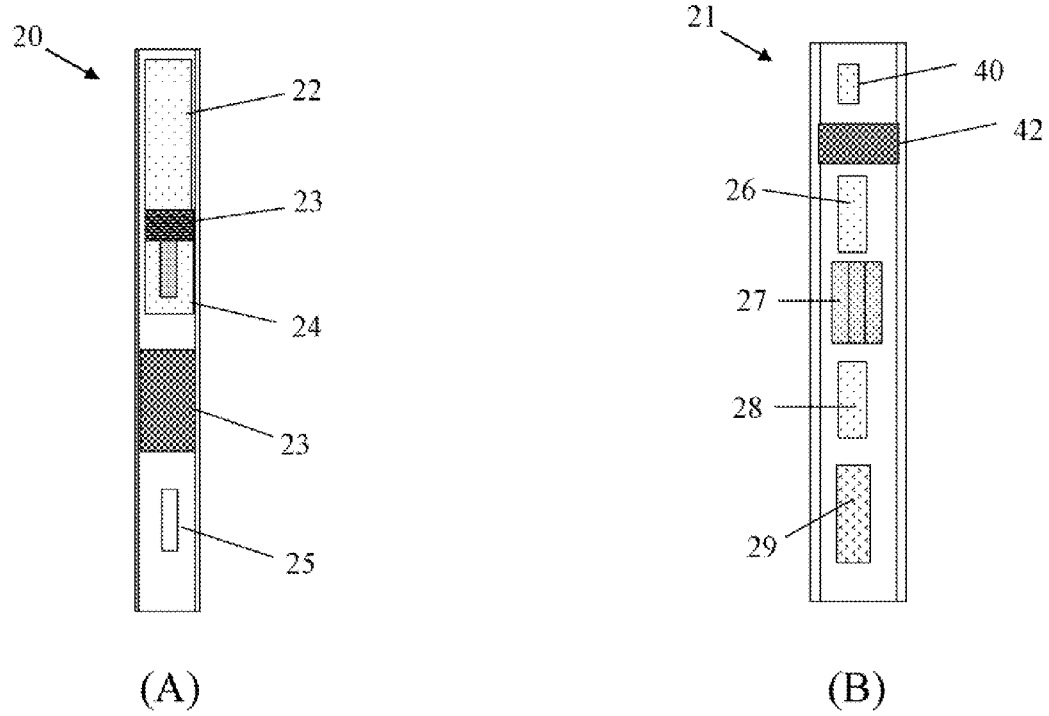
FIG 2A shows a traditional chemical source neutron tool, e.g. a CNL® tool.
FIG. 2B shows an electronic source neutron tool, e.g. an APS® tool.

The three inputs that are needed for thermal neutron porosity calculation, as mentioned above, are slowing down length ($L_s$), formation sigma ($\Sigma$), and bulk density ($\rho$). Formation sigma ($\Sigma$), which is a measure of the thermal neutron capture property of a formation (i.e., thermal neutron capture cross section), can be obtained directly from the array thermal detector measurements (shown as 28 in FIG. 2B). In addition, the slowing-down length ($L_s$) can be extracted from the APS® Array/Far countrate ratio. Finally, the bulk density ($\rho$) can be estimated from the slowing-down length ($L_s$) and APS® Near/Far countrate ratios. Thus, all the measurements needed to reproduce the CNL® thermal neutron porosity can be obtained using a single APS® tool. An alternate method is to obtain formation sigma ($\Sigma$) and bulk density ($\rho$) using traditional measurement techniques known to one of ordinary skill in the art.

Figure 4:
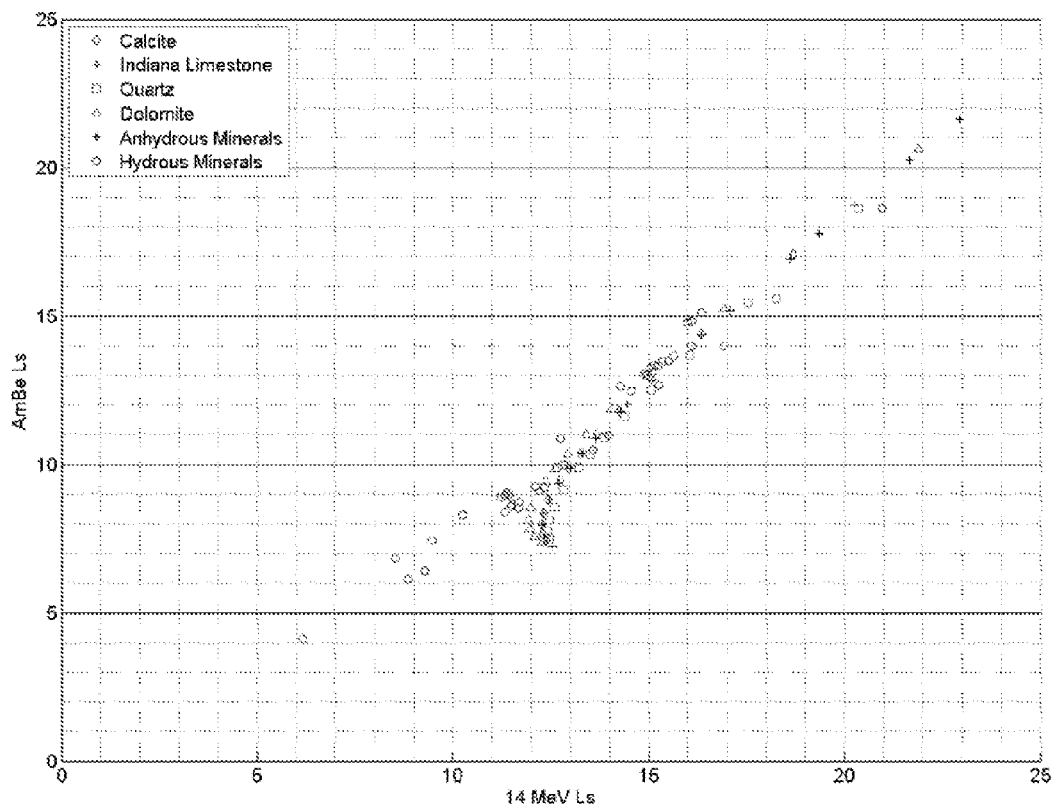
FIG. 4 shows a chart illustrating correlation between slowing-down lengths from two different tools.

As noted above, the slowing-down length for one neutron source cannot be related to that of a different source in a simple manner. This is evident from FIG. 4, which shows a direct correlation of slowing down lengths for two different tools, APS® (14 MeV neutrons) and CNL® (AmBe), in formations with various properties. The data shown in FIG. 4 are generated using SNUPAR®, a nuclear properties program commonly used in neutron tool analysis, see for example McKeon and Scott, "SNUPAR—a nuclear parameter code for nuclear geophysics application," Nuclear Geophysics, vol. 2, no. 4, pp. 215-230 (1988). The formations in this simulation have various porosities and may represent limestone, sandstone, and dolomite of various porosities as well as halite, anhydrite, and many pure clay minerals. It is apparent from FIG. 4 that the slowing down lengths from one tool do not correlate with those from a second tool in a simple manner.

Figure 5:
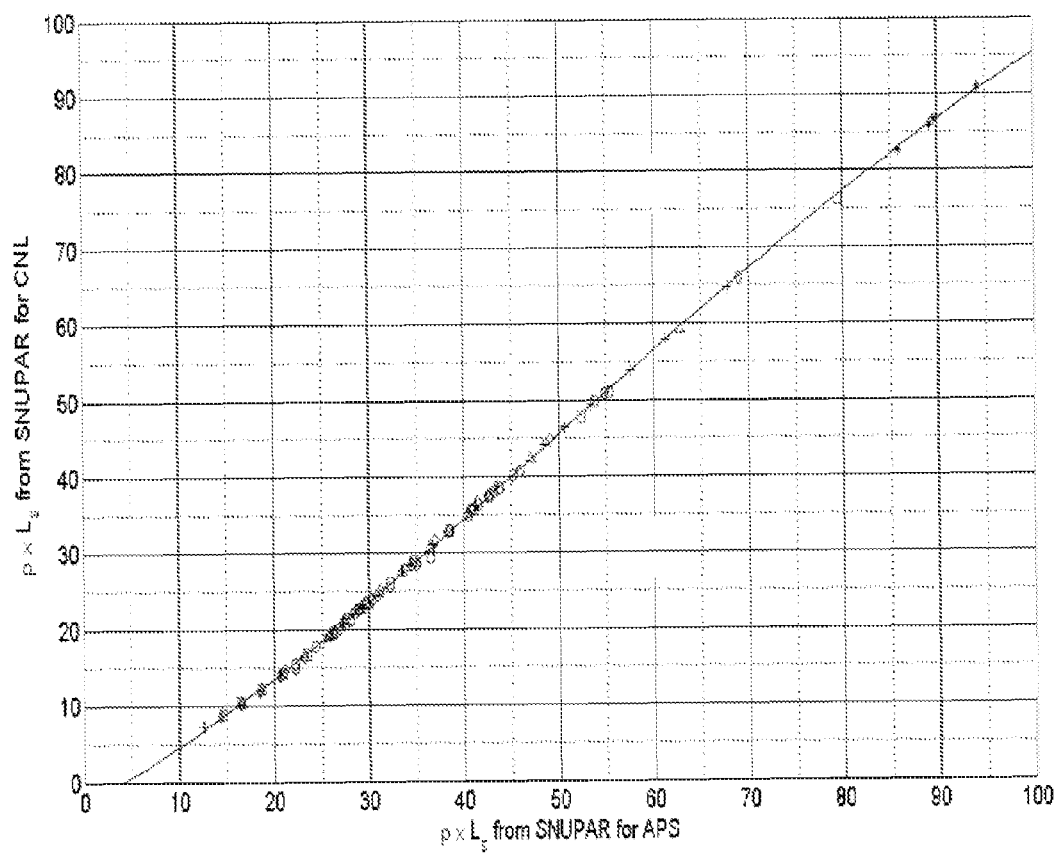
FIG. 5 shows a chart illustrating correlation between slowing-down lengths from two different tools after multiplying by bulk density in accordance with one embodiment of the invention.

Indeed, as shown in FIG. 5, a good correlation can be found between neutron slowing-down lengths of different sources in the same formation, if the formation density is taken into account. The particular function relating the slowing-down lengths of the two sources shown in FIG. 5 can be described as:

$$L_2 = g(\rho, L_1) = G(\rho \times L_1)/\rho$$

This example shows that it is possible to determine CNL® slowing-down length needed for porosity calculations from APS® slowing-down length and the formation bulk density ($\rho$). Note that other functional forms, different from the one shown above, may also be used.

Once the slowing down length from one tool can be converted to the corresponding slowing down length of the second tool, then the "expected" countrate ratio of the second tool can be computed based on a proper function that relates the slowing down length and countrate ratio of the same tool. Because the countrate ratios are derived from detection of neutrons that have traversed the formation, the countrate ratios are likely dependent on various formation parameters, such as formation sigma ($\Sigma$) and formation bulk density ($\rho$). Therefore, the countrate ratios may relate to slowing down lengths ($L_s$) according to a function, $f(L_s, \Sigma, \rho)$, that depends on both the formation sigma ($\Sigma$) and bulk density ($\rho$).

Computations show that the dependence of $f(L_s, \Sigma, \rho)$ on formation bulk density ($\rho$) may be a second order effect. Therefore, it may be desirable to treat the dependence on the formation bulk density ($\rho$) as a separate term. That is, the function, $f(L_s, \Sigma, \rho)$, may be separated into two terms, $m(\rho)$ and $h(L_s, \Sigma)$, as shown below:

$$\text{Ratio} = f(L_s, \Sigma, \rho) = m(\rho) \times h(L_s, \Sigma)$$

Figure 6:
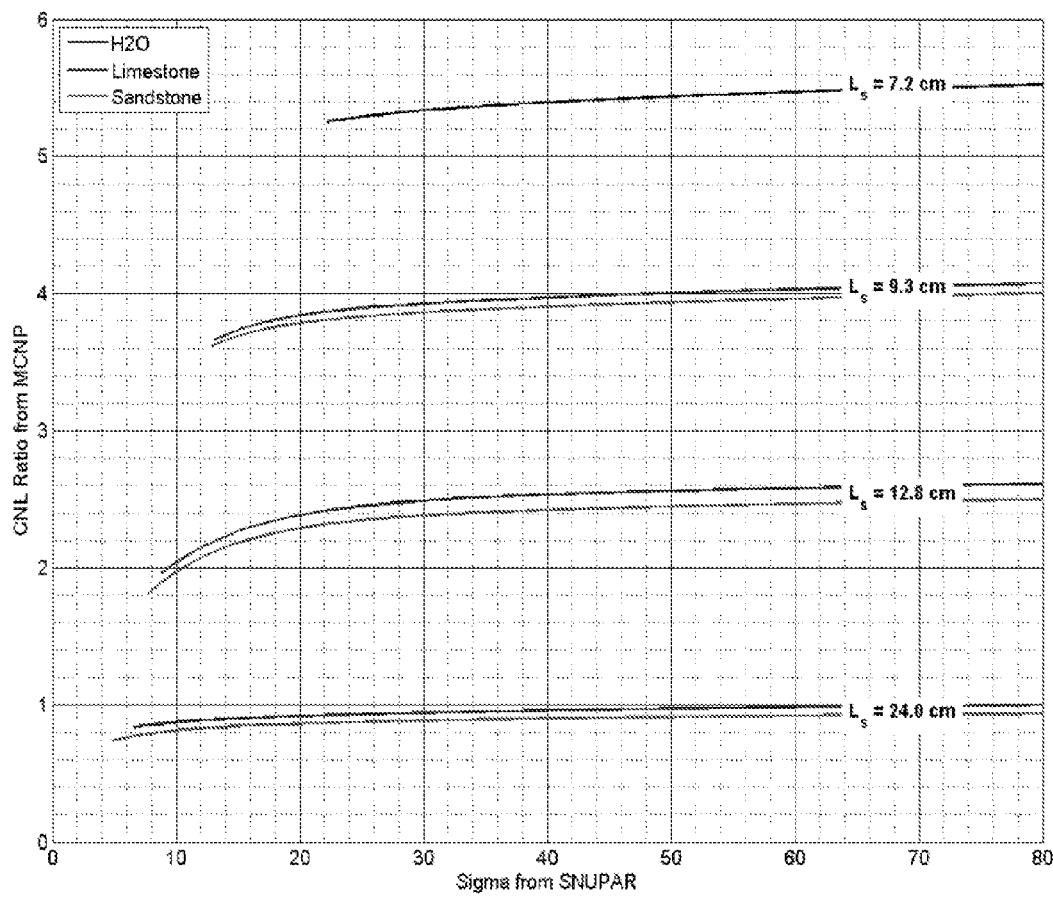
FIG 6. shows a chart illustrating correlation between countrate ratio and slowing-down length and sigma.

Therefore, one can consider the dependence of countrate ratios on the formation sigma ($\Sigma$) and formation bulk density ($\rho$) separately. The dependence (i.e., $h(L_s, \Sigma)$) of countrate ratios on the formation sigma ($\Sigma$) is illustrated in FIG. 6. The data points shown in FIG. 6 are derived from modeling. The countrate ratios are computed using a neutron Monte Carlo modeling code, while the corresponding slowing down lengths and formation densities are computed using SNUPAR® for the same formations.

FIG. 6 shows the results obtained for limestone and sandstone at several slowing-down lengths and sigma. For both lithologies, the CNL® ratios rapidly increase as the slowing down lengths decrease (from less than 1 at $L_s$=24.0 cm to more than 5 at $L_s$=7.2 cm). In all curves, the CNL® ratios increase slowly as sigma ($\Sigma$) increases. Various functions (e.g., polynomial, etc.) may be used to define these curves. For example, the correlation functions, $h(L_s, \Sigma)$, used to derive the CNL® ratios may be estimated from these curves as:

$$h(L_s, \Sigma) = a_1(L_s) \times ln(1+\Sigma) + a_2(L_s) + (0.5 - a_2(L_s)) \times exp(a_3(L_s) \times \Sigma)$$

One of ordinary skill in the art would appreciate that other functions may also be fitted to the curves and used for deriving the countrate ratios. Once such a function is derived, a look-up table may be constructed for future use, instead of using the function.

Figure 7:
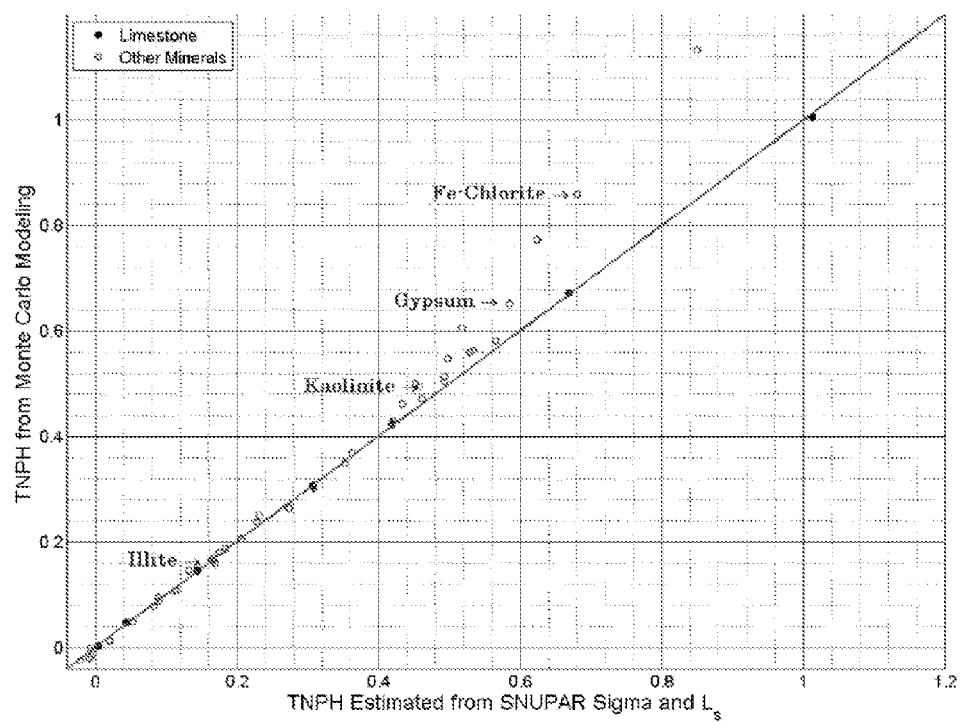
FIG. 7 shows a chart illustrating correlation between modeled thermal neutron porosities (TNPH) and those derived from the relationship shown in FIG. 6.

Because countrate ratios depend on formation sigma ($\Sigma$), formation bulk density ($\rho$), and slowing down lengths ($L_s$), the above correlation function, $h(L_s, \Sigma)$, may not be able to produce accurate results for countrate ratios without taking into account the impact of formation bulk density ($\rho$). FIG. 7 illustrates the correlation between thermal neutron porosities derived from Monte Carlo simulation and those estimated from SNUPAR® computation based on the above derived function, $h(L_s, \Sigma)$. It is apparent that the correlation is reasonable for porosities below 0.4. However, above 0.4, the correlation indicates need for an additional correction.

Figure 8:
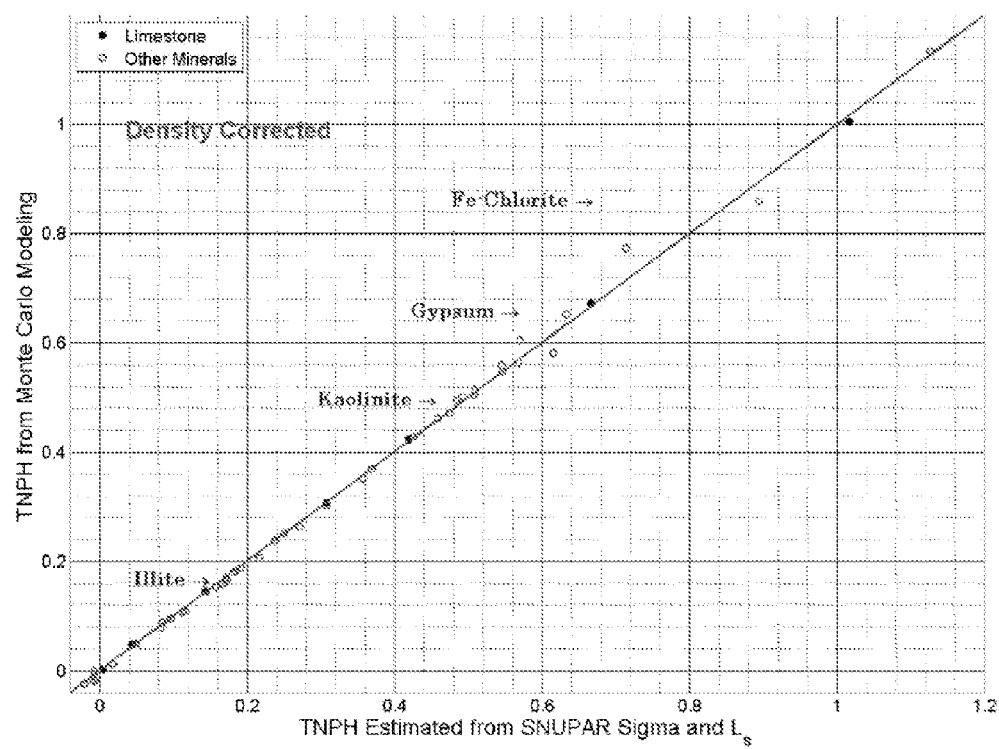
FIG. 8 shows a chart illustrating correlation between modeled thermal neutron porosities (TNPH) and those derived from the relationship shown in FIG. 6 after correction for formation bulk density effects.

As shown in FIG. 8, the correlation is significantly improved, if the contribution from the formation bulk density ($\rho$) is taken into account. As noted above, the dependence on the formation bulk density may be second order. Again, the precise functions for the formation bulk density ($\rho$) correction may vary depending on the situations and various functional forms may be used, including polynomial. The function used in deriving the data shown in FIG. 8 has the following form: $g(\rho) = 1.0 + b \times (\rho - \rho_{ref})$, where b is the fitting coefficient and $\rho_{ref}$ is the density expected for a clean, water-filled formation having thermal neutron porosity computed from the first order estimate of the ratio.

Some embodiments of the invention relate to systems and programs for performing methods of the invention. For example, methods of the invention may be embodied in one or more programs that include instructions to cause a processor (a computer) to perform the steps outlined above. Such a program may be recorded on a computer readable medium, such as a hard disk, floppy disk, CD, DVD, flash memory, etc. A system in accordance with embodiments of the invention may include a computer (or equivalent) that includes a processor and a memory, wherein the memory may include a program for performing a method of the invention. One of ordinary skill in the art would appreciate that any computer or processor may be used for such purposes.

Advantages of the invention may include one or more of the following. Methods of the invention can be used to correlate the slowing-down lengths from different neutron sources. In addition, embodiments of the invention provide methods for computing thermal neutron porosities based on measurements obtained from a tool that cannot directly provide such data. For example, methods of the invention can be used to convert the slowing-down length from an electronic neutron source tool (e.g., APS®) into the corresponding slowing down length, countrate ratio, and formation porosity of a chemical source neutron tool (e.g., CNL®). Therefore, methods of the invention allow an electronic source neutron tool to be used in place of a chemical source neutron tool, leading to enhanced safety, security, and environmental benefits. Note that methods of the invention are tool independent and can be applied to wireline tools, LWD tools, MWD tools, LWT tools, etc. Furthermore, the measurements to be used in these methods may be obtained in a cased hole or an open hole.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for determining at least one formation property calculated from neutron measurements acquired with a downhole tool, comprising:
   Emitting neutrons from a source in the tool into the formation;
   Detecting neutrons with at least one detector in the downhole tool;
   Calculating a first slowing-down length ($L_1$) based on the detected neutrons; and
   Deriving a second slowing-down length ($L_2$) based on the first slowing-down length ($L_1$).

2. The method of claim 1, wherein the source is an electronic neutron source.

3. The method of claim 1, wherein the second slowing-down length ($L_2$) is associated with a chemical neutron source.

4. The method of claim 3, wherein the chemical neutron source is one of an AmBe, Cf, PuBe and RaBe source.

5. The method of claim 1, wherein the second slowing-down length ($L_2$) is associated with an electronic neutron source.

6. The method of claim 5, wherein the electronic neutron source is one of a DD or DT source.

7. The method of claim 1, wherein the second slowing-down length ($L_2$) is associated with a source energy different from an energy associated with the source.

8. The method of claim 7, wherein the second slowing-down length ($L_2$) is associated with a lower source energy compared to the energy associated with the source.

9. The method of claim 1, wherein the second slowing-down length ($L_2$) is associated with at least one detector spacing that is different from a first distance between the detector and the source.

10. The method of claim 9, the downhole tool further comprising a second detector a second distance measured from the source, the first and second distance comprising a set of detector spacings of the downhole tool, wherein the slowing-down length ($L_2$) is associated with a set of detector spacings that is different than the set of detector spacings of the downhole tool.

11. The method of claim 1, wherein the second slowing-down length ($L_2$) is associated with a detector energy response that is different from an energy response associated with the detector.

12. The method of claim 1, further comprising the step of:
   deriving a correlation function for relating slowing-down lengths from the source to slowing-down lengths associated with a second source, wherein the correlation function depends on at least one property of the formation.

13. The method of claim 12, wherein the at least one property of the formation is selected from the group consisting of bulk density of the formation, sigma of the formation, and slowing-down time of the formation.

14. The method of claim 13, wherein the deriving of the correlation function is by computer modeling of slowing-down lengths of a first neutron tool and a second neutron tool in a plurality of formations having different properties.

15. The method of claim 14, wherein the computer modeling comprises:
   modeling a first series of slowing-down lengths for the first neutron tool and a second series of slowing-down lengths for the second neutron tool in a plurality of formations having different properties;
   determining the correlation function for correcting the first series of slowing-down lengths such that the corrected first series of slowing-down lengths corresponds to the second series of slowing-down lengths.

16. The method of claim 14, wherein the determining the correlation function involves curve fitting.

17. The method of claim 1, further comprising determining a countrate ratio based on the derived slowing-down length ($L_2$).

18. The method of claim 17, wherein the determining of the thermal neutron countrate ratio uses a function that depends on at least one of a bulk density ($\rho$) of the formation or a sigma ($\Sigma$) of the formation.

19. The method of claim 17, further comprising deriving a formation neutron porosity based on the countrate ratio.

20. A method for determining thermal neutron porosity based on a slowing-down length of a formation calculated from neutron measurements acquired with a neutron tool having an electronic neutron source or an epithermal neutron detector, comprising:
   converting the slowing-down length into a computed slowing-down length corresponding to thermal neutron slowing down in the formation, wherein the converting uses a correlation function that depends on a bulk density ($\rho$) of the formation;
   deriving a thermal neutron countrate ratio based on the computed slowing-down length, wherein the deriving uses a function that depends on the bulk density ($\rho$) of the formation and a sigma ($\Sigma$) of the formation; and
   computing the formation neutron porosity from the thermal neutron countrate ratio.

21. A computer readable medium comprising a program for deriving a measurement parameter from a slowing-down length ($L_1$) of a first neutron tool in the formation, wherein the program having instructions for:
   deriving a correlation function for relating slowing-down lengths from the first neutron tool to slowing-down lengths from a second neutron tool, wherein the correlation function depends on at least one property of the formation; and
   applying the correlation function to the slowing-down length ($L_1$) of the first neutron tool to derive a slowing-down length ($L_2$) of the second neutron tool.

22. The computer readable medium of claim 21, wherein the deriving the correlation function is by computer modeling of slowing-down lengths for the first neutron tool and the second neutron tool in a plurality of formations having different properties.

23. The computer readable medium of claim 22, wherein the computer modeling comprises:
   modeling a first series of slowing-down lengths for the first neutron tool and a second series of slowing-down lengths for the second neutron tool in a plurality of formations having different properties;
   determining the correlation function for correcting the first series of slowing-down lengths such that the corrected first series of slowing-down lengths correspond to the second series of slowing-down lengths.

24. The computer readable medium of claim 21, wherein the program further comprises instructions for determining a countrate ratio based on the derived slowing-down length ($L_2$) of the second neutron tool.

25. The computer readable medium of claim 21, wherein the program further comprises instructions for deriving a formation neutron porosity based on the countrate ratio.

26. A method for converting measurements obtained with an electronic source neutron tool into measurements that could have been obtained with a chemical source neutron tool, comprising steps of:

Emitting neutrons from an electronic source in the tool into the formation;

Detecting neutrons with at least one detector in the downhole tool;

Calculating a first slowing-down length ($L_1$) based on the detected neutrons; and Deriving a second slowing-down length ($L_2$) based on the first slowing-down length ($L_1$).

27. A method for converting the slowing-down length ($L_1$) measured by a first neutron tool in the formation into a slowing-down length ($L_2$) that would be measured by a second neutron tool if it had been in the same formation, comprising the steps of:

Emitting neutrons from a source in the tool into the formation;

Detecting neutrons with at least one detector in the downhole tool;

Calculating a first slowing-down length ($L_1$) based on the detected neutrons; and Deriving a second slowing-down length ($L_2$) based on the first slowing-down length ($L_1$).

28. A method according to claim 27 wherein the first neutron tool comprises an electronic neutron source, and the second neutron tool comprises a chemical neutron source.

29. A method according to claim 27 wherein the first neutron tool comprises a chemical neutron source, and the second neutron tool comprises an electronic neutron source.

* * * * *